United States Patent
Schwarze et al.

(10) Patent No.: US 9,878,497 B2
(45) Date of Patent: Jan. 30, 2018

(54) METHOD AND DEVICE FOR CONTROLLING AN IRRADIATION SYSTEM

(71) Applicant: SLM Solutions Group AG, Luebeck (DE)

(72) Inventors: Dieter Schwarze, Luebeck (DE); Andreas Wiesner, Luebeck (DE)

(73) Assignee: SLM Solutions Group AG, Luebeck (DE)

( * ) Notice: Subject to any disclaimer, the term of this patent is extended or adjusted under 35 U.S.C. 154(b) by 543 days.

(21) Appl. No.: 14/550,439

(22) Filed: Nov. 21, 2014

(65) Prior Publication Data

US 2015/0174827 A1 Jun. 25, 2015

(30) Foreign Application Priority Data

Nov. 21, 2013 (EP) ..................................... 13193905

(51) Int. Cl.
  *G06F 19/00* (2011.01)
  *B29C 67/00* (2017.01)
  (Continued)

(52) U.S. Cl.
  CPC ........ B29C 67/0088 (2013.01); B22F 3/1055 (2013.01); B23K 26/0604 (2013.01);
  (Continued)

(58) Field of Classification Search
  USPC ................................................. 700/119–120
  See application file for complete search history.

(56) References Cited

U.S. PATENT DOCUMENTS 5,536,467 A   7/1996  Reichle et al.
5,658,412 A *  8/1997  Retallick ............... B22F 3/1055
                                                    156/272.8
(Continued)

FOREIGN PATENT DOCUMENTS

DE   102005014483 A1   10/2006
DE   102006059851 A1    7/2008
(Continued)

OTHER PUBLICATIONS

EP Search Report, EP Appln. No. 13193905, dated Aug. 5, 2014, 7 pgs.
(Continued)

*Primary Examiner* — Kidest Bahta
(74) *Attorney, Agent, or Firm* — Taft Stettinius & Hollister LLP (57) ABSTRACT

A method for controlling an irradiation system (20) for use in an apparatus (10) for producing a three-dimensional work piece and comprising a plurality of irradiation units (22a, 22b) a first and a second irradiation area (18a, 18b) as well as an overlap area (26) arranged between the first and the second irradiation area (18a, 18b) is defined on a surface of a carrier (16) adapted to receive a layer of raw material powder. A first irradiation area (22a) of the irradiation system (20) is assigned to the first irradiation area (18a) and the overlap area (26), and a second irradiation unit (22b) of the irradiation system (20) is assigned to the second irradiation area (18b) and the overlap area (26). If it is determined that a section (S) or a radiation pattern according to which radiation beams (24a, 24b) emitted by the irradiation units (22a, 22b) of the irradiation system (20) are guided over the layer of raw material powder received on the carrier (16) and/or a contour (C) of the three-dimensional work piece to be produced extend(s) into the first and the second irradiation area (18a, 18b) defined on the surface of the
(Continued)

carrier (16), said section (S) of the radiation pattern and/or said contour (C), in a splitting region of the section (S) of the radiation pattern and/or the contour (C) which is located in the overlap area (26) arranged between the first and the second irradiation area (18a, 18b), is split into a first portion (S1, C1) and a second portion (S2, C2). The first portion (S1, C1) of said section (S) of the radiation pattern and/or said contour (C) is assigned to the first irradiation unit (22a) and the second portion (S2, C2) of said section (S) of the radiation pattern and/or said contour (C) is assigned to the second irradiation unit (22b).

15 Claims, 7 Drawing Sheets (51) Int. Cl.

| | | |
|---|---|---|
| B22F 3/105 | (2006.01) | |
| B23K 26/06 | (2014.01) | |
| B33Y 50/02 | (2015.01) | |
| G05B 15/02 | (2006.01) | |
| B23K 26/342 | (2014.01) | |
| B29C 64/386 | (2017.01) | |
| B29C 64/153 | (2017.01) | |

(52) U.S. Cl.
CPC .......... B23K 26/342 (2015.10); B29C 64/386 (2017.08); B33Y 50/02 (2014.12); G05B 15/02 (2013.01); *B22F 2003/1056* (2013.01); *B22F 2003/1057* (2013.01); *B29C 64/153* (2017.08); *Y02P 10/295* (2015.11)

(56) References Cited

U.S. PATENT DOCUMENTS

| | | | | |
|---|---|---|---|---|
| 5,730,925 A * | 3/1998 | Mattes | ................... | B22F 3/1055 219/121.73 |
| 5,753,274 A * | 5/1998 | Wilkening | .............. | B23K 26/34 264/255 |
| 5,932,059 A * | 8/1999 | Langer | ................ | B29C 67/0051 156/272.8 |
| 6,042,774 A * | 3/2000 | Wilkening | .............. | B23K 26/34 264/460 |
| 6,135,257 A * | 10/2000 | Englund | ................ | F16D 25/123 192/113.34 |
| 2003/0206820 A1* | 11/2003 | Keicher | ................ | B22F 3/1055 419/9 |
| 2005/0023256 A1* | 2/2005 | Sankaranarayanan | ..................... | B23K 26/0823 219/121.63 |
| 2005/0263932 A1* | 12/2005 | Heugel | ............... | B29C 67/0077 264/113 |
| 2006/0228248 A1* | 10/2006 | Larsson | .............. | B29C 67/0077 419/6 |
| 2008/0169586 A1 | 7/2008 | Hull et al. | | |
| 2008/0241392 A1 | 10/2008 | Dimter et al. | | |
| 2010/0125356 A1 | 5/2010 | Shkolnik et al. | | |
| 2013/0112672 A1 | 5/2013 | Keremes | | |
| 2013/0264750 A1 | 10/2013 | Hofacker et al. | | |
| 2013/0270750 A1 | 10/2013 | Green | | |

FOREIGN PATENT DOCUMENTS

| | | |
|---|---|---|
| DE | 102011105045 B3 | 6/2012 |
| EP | 1793979 | 4/2014 |
| EP | 2786858 | 10/2014 |
| EP | 2862651 A1 | 4/2015 |
| JP | 2009006509 A | 1/2009 |
| WO | 2009080016 A1 | 7/2009 |

OTHER PUBLICATIONS

Constructive drawing X-Line 1000R, Mar. 1, 2012.
Technical Brochure X-Line 1000R, Nov. 2012.
Press release by Fraunhofer ILT: LaserCusing im XXL-Format für den Autobauer Daimler, Oct. 16, 2012.
Johannes, Concept Laser X line 1000R: XXL Laser 3D-Drucker für den Automotiv Bereich, https://3druck.com/drucker-und-produkte/concept-laser-x-line-1000r-xxl-laser-3d-drucker fuer-den-automotiv-bereich-527566, Dec. 7, 2012.
Culp, Eric: Lasered aluminium could supplant machined carparts, http://www.etmm-online.com/lasered-aluminium-could-supplant-machined-car-parts-a-385818, European Tool & Mould Marking, Dec. 2012.
Scholl, Ilona: Additive manufacturing with metals in automotives, http://www.engineerlive.com/content/additive-manufacturing-metals-automotives, Mar. 11, 2013.
Kroh, Rüdiger: Concept Laser und Fraunhofer ILT zeigen Laserschmelzanlage, http://www.maschinemarkt.vogel.de/concept-laser-und-fraunhofer-ilt-zeigen-laserschmelzanlage-a-387168, Nov. 27, 2012.
Declaration in lieu of an oath (eidesstattliche Versicherung) by Dr. Florian Bechmann (head of R&D department at Concept Laser GmbH), Oct. 19, 2016.
Declaration in lieu of an oath (eidesstattliche Versicherung) by Jens Stammberger (assistant team leader of the construction department at Concept Laser GmbH), Oct. 19, 2016.
Declaration in lieu of an oath (eidesstattliche Versicherung) by Markus Lippert (software engineer at Concept Laser GmbH), date Oct. 18, 2016.

\* cited by examiner

METHOD AND DEVICE FOR CONTROLLING AN IRRADIATION SYSTEM

The present invention relates to a method and a device for controlling an irradiation system for use in an apparatus for producing a three-dimensional work piece by irradiating layers of a raw material powder with electromagnetic or particle radiation.

Selective laser melting or laser sintering is an additive layering process by which pulverulent in particular metallic and/or ceramic raw materials can be processed to three-dimensional work pieces of complex shapes. To that end, a raw material powder layer is applied onto a carrier and subjected to laser radiation in a site selective manner in dependence on the desired geometry of the work piece that is to be produced. The laser radiation penetrating into the powder layer causes heating and consequently melting or sintering of the raw material powder particles. Further raw material powder layers are then applied successively to the layer on the carrier that has already been subjected to laser treatment, until the work piece has the desired shape and size. Selective laser melting or laser sintering can be used in particular for the production of prototypes; tools, replacement parts or medical prostheses, such as, for example, dental or orthopaedic prostheses, on the basis of CAD data.

An apparatus for producing moulded bodies from pulverulent raw materials by selective laser melting is described, for example, in EP 1 793 979 A1. The prior art apparatus comprises a process chamber which accommodates a plurality of carriers for the shaped bodies to be manufactured. A powder layer preparation system comprises a powder reservoir holder that can be moved to and fro across the carriers in order to apply a raw material powder onto the carriers. The raw material powder applied onto the carriers is irradiated with a laser beam emitted by an irradiation system.

As described in non-published European patent application No. 13 162 179, operation of an irradiation system employed in an apparatus for producing a three-dimensional work piece by selectively irradiating layers of a raw material powder with electromagnetic or particle radiation, by means of a control unit, may be controlled such that a radiation beam emitted by the irradiation system is guided over a raw material powder layer according to a radiation pattern. Typically, the radiation pattern contains a plurality of scan vectors which, in at least a section of the radiation pattern, extend substantially parallel to each other. Further, the radiation pattern may comprise a plurality of sections, wherein, in each section, the scan vectors may extend substantially parallel to each other, but inclined relative to the scan vectors in an adjacent section of the radiation pattern. The sections of the radiation pattern may define a chessboard pattern, a stripe pattern comprising a plurality of substantially parallel stripes or a pattern comprising arbitrarily shaped sections.

Further, as discussed in non-published European patent application No. 13 188 704, in order to produce a large three-dimensional work piece, the raw material powder may be irradiated with electromagnetic or particle radiation by means of an irradiation system comprising a plurality of irradiation units, wherein each irradiation unit may be associated with an irradiation area defined on a surface of a carrier onto which the raw material powder to be irradiated is applied. Each irradiation unit of the irradiation system is controlled such that the raw material powder applied onto the irradiation area associated with the irradiation unit is irradiated in a site selective manner and independent of the irradiation of other irradiation areas not associated with the irradiation unit in question. Hence, each irradiation area defined on the carrier may be individually and independently irradiated using a desired irradiation pattern. Beside the irradiation areas, at least one overlap area may be defined on the surface of the carrier. Raw material powder applied onto the overlap area can be selectively irradiated with electromagnetic or particle radiation by at least two irradiation units of the irradiation system. Areas of a large three-dimensional work piece to be built-up on the carrier, which are disposed in adjoining regions or adjacent in irradiation areas, thus may be generated with the desired reliability and high quality.

SUMMARY

The invention is directed at the object of providing a method and a device, which allow an irradiation system for use in an apparatus for producing a three-dimensional work piece by irradiating layers of a raw material powder with electromagnetic or particle radiation and comprising a plurality of irradiation units to be controlled in such a manner that a high-quality three-dimensional work piece can be produced.

This object is addressed by a method as defined in claim 1 and a device as defined in claim 9.

In a method for controlling an irradiation system for use in an apparatus for producing a three-dimensional work piece and comprising a plurality of irradiation units, a first and a second irradiation area as wall as an overlap area arranged between the first and the second irradiation area are defined on a surface of a carrier adapted to receive a layer of new material powder. The carrier may be disposed in a process chamber of the apparatus for producing a three-dimensional work piece and may be a rigidly fixed carrier. Preferably, however, the carrier is designed to be displaceable in vertical direction so that, with increasing construction height of a work piece, as it is built up in layers from the raw material powder, the carrier can be moved downwards in the vertical direction. The process chamber may be sealable against the ambient atmosphere, i.e., against the environment surrounding the process chamber, in order to be able to maintain a controlled atmosphere, in particular an inert atmosphere within the process chamber. The raw material powder to be received on the carrier preferably is a metallic powder, in particular a metal alloy powder, but may also be a ceramic powder or a powder containing different materials. The powder may have any suitable particle size or particle size distribution. It is, however, preferable to process powders of particle sizes <100 μm.

The irradiation system to be controlled serves to selectively irradiate the raw material powder applied onto the carrier with electromagnetic or particle radiation. In particular, the raw material powder applied onto the carrier may be subjected to electromagnetic or particle radiation in a site-selective manner in dependence on the desired geometry of the work piece that is to be produced. The irradiation system preferably is adapted to irradiate radiation onto the raw material powder which causes a site-selective melting of the raw material powder particles.

Each irradiation unit of the irradiation system may comprise a radiation beam source, in particular a laser beam source. It is, however, also conceivable that plural irradiation units are associated with a single radiation beam source, wherein a radiation beam provided by the single radiation beam source, by suitable means such as, for example, beam splitters and/or mirrors, may be split and/or deflected as required so as to direct the radiation beam provided by the radiation beam source to the associated irradiation units. Further, each irradiation unit may comprise at least one optical unit for guiding and/or processing a radiation beam emitted by the radiation beam source and supplied to the irradiation unit. The optical unit may comprise optical elements such as an object lens, in particular an f-theta lens, and a scanner unit, the scanner unit preferably comprising a diffractive optical element and a deflection mirror.

Each irradiation area defined on the surface of the carrier, i.e. the raw material powder applied thereon, may be selectively irradiated with electromagnetic or particle radiation by a selected one of the irradiation units of the irradiation system independent from the other irradiation units of the irradiation system. Hence, each irradiation area defined on the carrier may be individually and independently irradiated using a desired irradiation pattern. For example, if desired, a small sized three-dimensional work piece may be built-up in only one irradiation area by selectively irradiating the irradiation area with electromagnetic or particle radiation. Preferably, however, the plurality of irradiation areas defined on the carrier are simultaneously irradiated with electromagnetic or particle radiation by suitable controlling the irradiation units of the irradiation system, thus allowing a large three-dimensional work piece to be built-up in an additive layer construction process within a relatively short time and thus at reasonable costs.

In the method for controlling an irradiation system, a first irradiation unit of the irradiation system is assigned to the first irradiation area and the overlap area. Further, a second irradiation unit of the irradiation system is assigned to the second irradiation area and the overlap area. The first irradiation area then may be selectively irradiated with electromagnetic or particle radiation provided by the first irradiation unit, whereas the second irradiation area may be selectively irradiated with electromagnetic or particle radiation provided by the second irradiation unit. The overlap area arranged between the first and the second irradiation area may be irradiated with electromagnetic or particle radiation provided by either the first or the second irradiation unit. By defining a suitable overlap area between the first and the second irradiation area, portions or a large three-dimensional work piece to be built-up on the carrier, which are disposed in an adjoining region of the first and the second irradiation area may be generated with the desired reliability and high quality. However, the first and the second irradiation unit must be suitably controlled in order to ensure that a three-dimensional work piece extending over more than one irradiation area is built-up with the desired consistency and thus quality.

The method for controlling an irradiation system therefore involves an analysis of a radiation pattern according to which radiation beams emitted by the irradiation units of the irradiation system are guided over the layer of raw material powder received on the carrier or the already produced layers of the work piece and/or a contour of the three-dimensional work piece to be produced and in particular an analysis of the arrangement of the radiation pattern and/or the contour relative to the irradiation areas and the overlap area defined on the surface of the carrier. The radiation pattern may be any suitable radiation pattern, for example a chessboard pattern, a stripe pattern or a pattern comprising arbitrarily shaped sections, wherein the individual sections of the radiation pattern may be defined by a plurality of scan vectors. For example, the scan vectors, in a section of the radiation pattern, may extend substantially parallel to each other, but may be inclined relative to the scan vectors in an adjacent section of the radiation pattern. The scan vectors may follow straight lines or curved lines. Radiation patterns according to which radiation beams emitted by the irradiation units of the irradiation system are guided over subsequent layers of raw material powder may be rotated relative to each other. By rotating the radiation patterns upon irradiating subsequent layers of raw material powder, excessive shrinkage and residual stresses in the generated work pieces may be minimized. The contour of the three-dimensional work piece to be produced may be a substantially line-shaped inner or outer contour of the three-dimensional work piece to be produced and may be defined by a plurality of individual scan points.

Specifically, in the method for controlling an irradiation system, a determination step is performed so as to determine whether a section of the radiation pattern according to which radiation beams emitted by the irradiation units of the irradiation system are guided over the layer of raw material powder received on the carrier and/or a contour of the three-dimensional work piece to be produced extend(s) into the first and the second irradiation area defined on the surface of the carrier. In other words, in the determination step, the arrangement of the radiation pattern and the contour relative to the irradiation areas and the overlap area defined on the surface of the carrier is analyzed so as to determine whether a section of the radiation pattern and/or the contour extend(s) into more than one irradiation area exclusively associated with only one irradiation unit.

If it is determined that a section of the radiation pattern and/or a contour of the three-dimensional work piece to be produced extend(s) into the first and the second irradiation area defined on the surface of the carrier, said section of the radiation pattern and/or said contour is split into a first portion and a second portion. In particular, said section of the radiation pattern and/or said contour is split in a splitting region of the section of the radiation pattern and/or the contour which is located in the overlap area arranged between the first and the second irradiation area. The first portion of said section of the radiation pattern and/or said contour is assigned to the first irradiation unit, whereas the second portion of said section of the radiation pattern and/or said contour is assigned to the second irradiation unit. Thus, the first portion of the section of the radiation pattern and/or the contour is defined by irradiating electromagnetic or particle radiation onto the raw material powder received on the carrier which is provided by the first irradiation unit assigned to the first irradiation area. Similarly, the second portion of the section of the radiation pattern and/or the contour is defined by irradiating electromagnetic or particle radiation onto the raw material powder received on the carrier which is provided by the second irradiation unit assigned to the second irradiation area.

By splitting sections of the radiation pattern and/or contours which extend into more than one irradiation area exclusively associated with only one irradiation unit into portions and by assigning these portions to suitable irradiation units, the sections of the radiation pattern and/or the contours can be reproduced in a reliable manner, although this would not be possible with a single irradiation unit of the irradiation system. Simultaneously, by defining that only sections of the radiation pattern and/or contours which extend into more than one irradiation area exclusively associated with only one irradiation unit should be split, the number of sections of the radiation pattern and/or contours which are in fact split is reduced to a minimum. As a result, the control of the irradiation units can be simplified and mutual interferences between the radiation beams emitted by the first and the second irradiation unit can be omitted. Consequently, a high-quality three-dimensional work piece can be produced.

If the analysis or the arrangement of the radiation pattern and/or a contour relative to the irradiation areas and the overlap area defined on the surface of the carrier reveals, that a section of the radiation pattern according to which radiation beams emitted by the irradiation units of the irradiation system are guided over the layer of raw material powder received on the carrier and/or a contour of the three-dimensional work piece to be produced in its entirety is located in the overlap area arranged between the first and the second irradiation area, said section of the radiation pattern and/or said contour preferably is assigned to either the first or the second irradiation unit. Hence, a section of the radiation pattern and/or a contour which in its entirety is located in the overlap area is not split, but assigned to either the first or the second irradiation unit and consequently defined by irradiating electromagnetic or particle radiation onto the raw material powder received on the carrier which is provided by either the first or the second irradiation unit.

The section of the radiation pattern and/or the contour which in its entirety is located in the overlap area arranged between the first and the second irradiation area may be assigned to the first irradiation unit, if a predefined element of the section of the radiation pattern and/or the contour is located in a region of the overlap area closer to the first irradiation area. To the contrary, the section of the radiation pattern and/or the contour which in its entirety is located in the overlap area arranged between the first and the second irradiation area may be assigned to the second irradiation unit if a predefined element of the section of the radiation pattern and/or the contour is located in a region of the overlap area closer to the second irradiation area. The predefined element of the section of the radiation pattern and/or the contour may, for example, be a center point or a central region of the section of the radiation pattern and/or the contour. For assessing whether the predefined element of the section of the radiation pattern and/or the contour is located closer to the first or the second irradiation area, it is, for example, possible to analyze the position of the predefined element relative to a center line of the overlap area. In case the overlap area is divided into a plurality of partitioning regions as will be described in more detail below, it is also conceivable to analyze the position of the predefined element relative to a center line of a selected partitioning region of the overlap area.

Sections of the radiation pattern and/or contours which extend into the overlap area and only one of the first and the second irradiation area may be treated similar to sections of the radiation pattern and/or contours which in their entirety are located in the overlap area, i.e. these sections of the radiation pattern and/or contours may be assigned to either the first or the second irradiation unit and hence defined by irradiating electromagnetic or particle radiation onto the raw material powder received on the carrier which is provided by either the first or the second irradiation unit. In particular, a section of the radiation pattern and/or a contour which extends into the overlap area and the first irradiation area preferably is assigned to the first irradiation unit, whereas a section of the radiation pattern and/or a contour, which extends into the second irradiation area and the overlap area preferably is assigned to the second irradiation unit.

If the analysis of the arrangement of the radiation pattern and/or a contour relative to the irradiation areas and the overlap area defined on the surface of the carrier reveals, that a section of the radiation pattern and/or a contour in its entirety is located in the first irradiation area, said section of the radiation pattern and/or said contour preferably, in its entirety, is assigned to the first irradiation unit. Hence, the section of the radiation pattern and/or the contour, in its entirety, may be defined by irradiating electromagnetic or particle radiation onto the raw material powder received on the carrier which is provided by the first irradiation unit. Similarly, if it is determined, that a section of the radiation pattern and/or a contour, in its entirety, is located in the second irradiation area, said section of the radiation pattern and/or said contour preferably, in its entirety, is assigned to the second irradiation unit and, as a result, the section of the radiation pattern and/or the contour may be defined by irradiation electromagnetic or particle radiation onto the raw material powder received on the carrier which is provided by the second irradiation unit.

In a preferred embodiment of the method for controlling an irradiation system, the overlap area defined on die surface of the carrier may be divided into a plurality of partitioning regions. For example, the overlap area may be divided into a plurality of partitioning stripes extending substantially parallel to each other. The section of the radiation pattern and/or the contour which extends into the first and the second irradiation area defined on the surface on the carrier may be split into a first portion and a second portion in a selected one of the plurality of partitioning regions. Dividing the overlap area into a plurality of partitioning regions provides the advantage, that the region of the overlap area, wherein the splitting of a section of the radiation pattern and/or a contour which extend(s) into the first and the second irradiation area is effected, in subsequent irradiation steps, may be varied. In other words, if a section of the radiation pattern and/or a contour, in a first irradiation step for irradiating a first layer of raw material powder received on the carrier, is spilt into a first portion and a second portion in a splitting region of the radiation pattern and/or the contour which is located in a first partitioning region of the overlap area, in a subsequent irradiation step for irradiating a subsequent layer of raw material powder received on the carrier, the splitting of a section of the radiation pattern and/or a contour area may be effected in another partitioning region of the overlap area.

The variation of the partitioning regions of the overlap area wherein sections of the radiation pattern are spilt may be effected independent of a rotation of the radiation pattern upon irradiating subsequent layers of raw material powder. The partitioning region, wherein the section of the radiation pattern and/or the contour is spilt into a first portion and a second portion, in subsequent irradiation steps, may be selected randomly or according to a predetermined order. For example, in case the overlap area is divided into four partitioning stripes, PS1, PS2, PS3, PS4, an order of the partitioning regions, wherein the section of the radiation pattern and/or the contour is split in subsequent irradiation steps, may be PS1, PS3, PS2, PS4.

Preferably, the section of the radiation pattern and/or the contour which extend(s) into the first and the second irradiation area defined on the surface of the carrier is adjusted in order to increase or to decrease a distance between the first and the second portion of the section of the radiation pattern and/or the contour. For example, in a section of the radiation pattern which is defined by a plurality of substantially parallel scan vectors, a distance between adjacent scan vectors in the splitting region of the section of the radiation pattern may be increased in order to avoid an excessive application of radiation energy into the splitting region of the section of the radiation pattern. Similarly, a contour may be adjusted in order to increase a distance between individual scan points of the contour in the splitting region of the contour, i.e. in the region of an intersection point at which the contour is split. To the contrary, it is, however, also conceivable to adjust a section of the radiation pattern defined by a plurality of substantially parallel scan vectors so as to decrease a distance between adjacent scan vectors in the splitting region of the section of the radiation pattern, or to adjust a contour such that individual scan points of the contour in the splitting region of the contour, i.e. in the region of an intersection point at which the contour is split, are disposed closer to each other, for example in order to ensure a consistent application of radiation energy also into the splitting region of the section of the radiation pattern and/or the contour.

Alternatively, or additionally thereto, at least one of the first and the section irradiation unit may be controlled so as to increase or to decrease the power of a radiation bean emitted by the first and/or the second irradiation unit in a part if the section of the radiation pattern and/or the contour which extend(s) into the first and the second irradiation area adjacent to the splitting region of the section of the radiation pattern and/or the contour. Controlling the power of the radiation beam emitted by the first and/or the second irradiation unit, similar to an adjustment of the section of the radiation pattern and/or the contour, allows to either avoid an excessive application of radiation energy into the splitting region of the section of the radiation pattern and/or the contour or to ensure a consistent application of radiation energy into the splitting region of the section of the radiation pattern and/or the contour, as desired.

At least one of the first and the second portion or the section of the radiation pattern and/or the contour which extends into the first and the second irradiation area defined on the surface of the carrier may comprise a predetermined minimum number of predefined elements of said section or the radiation pattern and/or said contour. Predefined elements of a section of the radiation pattern may, for example, be scan vectors defining the section of the radiation pattern. Predefined elements of a contour may, for example, be scan points defining the contour. By defining that at least one of the first and the second portion of the section of the radiation pattern and/or the contour should comprise a predetermined minimum number of predefined elements, the generation of portions of the section of the radiation pattern and/or the contour which comprise too few predetermined elements and hence may not be generated with the desired accuracy and reliability, is prevented.

In a preferred embodiment of the method for controlling an irradiation system, the first and the second irradiation unit of the irradiation system are controlled in such a manner that the first and the second portion of the section of the radiation pattern and/or the contour which extend(s) into the first and the second irradiation area defined on the surface of the carrier are successively irradiated with a radiation beam emitted by the first and the second irradiation unit, respectively. Thereby, interferences between the radiation beams emitted by the first and second irradiation unit may be omitted.

As already indicated above, the radiation pattern according to which radiation beams emitted by the irradiation units of the irradiation system are guided over the layer of raw materiel powder received on the carrier may contain a plurality of scan vectors. A section of such a radiation pattern which extends into the first and the second irradiation area defined on the surface of the carrier preferably is split into a first and a second portion between adjacent scan vectors. In other words, upon splitting a section or a radiation pattern defined by a plurality of scan vectors, splitting of individual scan vectors is avoided. Instead, the splitting is effected between adjacent, for example, parallel scan vectors.

A contour which extends into the first and the second irradiation area defined on the surface of the carrier may be split into a first and a second portion at an intersection point arranged between a first scan point of the contour located in the first irradiation area and a second scan point of the contour located in the second irradiation area. The intersection point, which should be located in the overlap area, in particular a selected partitioning region of the overlap area, may be a scan point which is already present, i.e. a scan point which constitutes a predefined element of the contour. In case a plurality of scan points of the contour are located in the overlap area, in particular the selected partitioning region of the overlap area, a scan point closest to a center line of the overlap area, in particular a center line of the selected partitioning region of the overlap area may be selected as the intersection point. In case, however, the contour does not contain a scan point located in the overlap area, in particular the selected partitioning region of the overlap area, an intersection point may be defined, for example as a point located on a center line of the overlap area, in particular on a center line of the selected partitioning region of the overlap area.

A device for controlling an irradiation system for use in an apparatus for producing a three-dimensional work piece and comprising a plurality of irradiation units comprises a definition unit adapted to define a first and a second irradiation area as well as an overlap area arranged between the first and the second irradiation area on a surface of a carrier adapted to receive a layer of raw material powder. The device further comprises a first assigning unit adapted to assign a first irradiation unit of the irradiation system to the first irradiation area and the overlap area, and to assign a second irradiation unit of the irradiation system to the second irradiation area and the overlap area. A determining unit of the device is adapted to determine that a section of a radiation pattern according to which radiation beams emitted by the irradiation units of the irradiation system are guided over the layer of raw material powder received on the carrier and/or a contour of the three-dimensional work piece to be produced extend(s) into the first and the second irradiation area defined on the surface of the carrier. The device further comprises a splitting unit adapted to split said section of the radiation pattern and/or said contour, in a splitting region of the radiation pattern and/or the contour which is located in the overlap area arranged between the first and the second irradiation area, into a first portion and a second portion. A second assigning unit is adapted to assign the first portion of said section of the radiation pattern and/or said contour to the first irradiation unit. Furthermore the second assigning unit is adapted to assign the second portion of said section of the radiation pattern and/or said contour to the second irradiation unit.

The determining unit may be adapted to determine that a section of the radiation pattern according to which radiation beams emitted by the irradiation units of the irradiation system are guided over the layer of raw material powder received on the carrier and/or a contour of the three dimensional work piece to be produced in its entirety is located in the overlap area arranged between the first and the second irradiation area. Furthermore, the second assigning unit may be adapted to assign said section of the radiation pattern and/or said contour to either the first or the second irradiation unit.

In particular, the second assigning unit may be adapted to assign the section of the radiation pattern and/or the contour which in its entirety is located in the overlap area arranged between the first and the second irradiation area to the first irradiation unit, if a predefined element of the section of the radiation pattern and/or the contour is located in a region of the overlap area closer to the first irradiation area. Moreover, the second assigning unit may be adapted to assign the section of the radiation pattern and/or the contour which in its entirety is located in the overlap area arranged between the first and the second irradiation area to the second irradiation unit, if a predetermined element of the section of radiation pattern and/or the contour is located in a region of the overlap area closer to the second irradiation area.

The device for controlling an irradiation system preferably further comprises a dividing unit adapted to divide the overlap area defined on the surface of the carrier into a plurality of partitioning regions. The splitting unit may further be adapted to split the section of the radiation pattern and/or the contour which extend(s) into the first and the second irradiation area defined on the surface of the carrier into a first portion and a second portion in a selected one of the plurality of partitioning regions and to select the partitioning region wherein said section of radiation pattern and/or the contour is split into a first portion end a second portion, in subsequent irradiation steps, randomly or according to a predetermined order.

The device for controlling an irradiation system may further comprises an adjusting unit adapted to adjust the section of the radiation pattern and/or the contour which extend(s) into the first and the second irradiation area defined on the surface of the carrier in order to increase or to decrease a distance between the first and the second portion of said section of radiation pattern and/or the contour.

Furthermore, the device may comprise a control unit adapted to control at least one of the first and the second irradiation unit so as to increase or to decrease the power of a radiation beam emitted by the first and/or the second irradiation unit in a part of said section of the radiation pattern and/or said contour adjacent to a splitting region of said section of a radiation pattern and/or said contour.

At least one of the first and the second portion of the section of radiation pattern and/or the contour which extend(s) into the first and the second irradiation area defined on the surface of the carrier may comprise a predetermined minimum number of predefined elements of said section of the radiation pattern and/or said contour.

The control unit of the device for controlling an irradiation system may further be adapted to control the first and the second irradiation unit in such a manner that the first and the second portion of the section of the radiation pattern and/or the contour which extend(s) into the first and the second irradiation area defined on the surface of the carrier are successively irradiated with a radiation beam emitted by the first and the second radiation unit, respectively.

The radiation pattern may contain a plurality of scan vectors. The splitting unit then preferably is adapted to split the section of the radiation pattern which extends into the first arid the second irradiation area defined on the surface on the carrier into a first and a second portion between adjacent scan vectors. Furthermore, the splitting unit may be adapted to split the contour which extends into the first and the second irradiation area defined on the surface of the carrier into a first and a second portion at an intersection point arranged between a first scan point of the contour located in the first irradiation area and a second scan point of the contour located in the second irradiation area.

Furthermore, the device for controlling an irradiation system may comprise further features which are explained in greater detail above in connection with the method for controlling an irradiation system. In other words, features described herein with reference to a method for controlling an irradiation system may be transferred to a device for controlling an irradiation system and vice versa.

BRIEF DESCRIPTION OF THE DRAWINGS

Preferred embodiments of the invention in the following are explained in greater detail with reference to the accompanying schematic drawings, in which.

DETAILED DESCRIPTION

Figure 1:
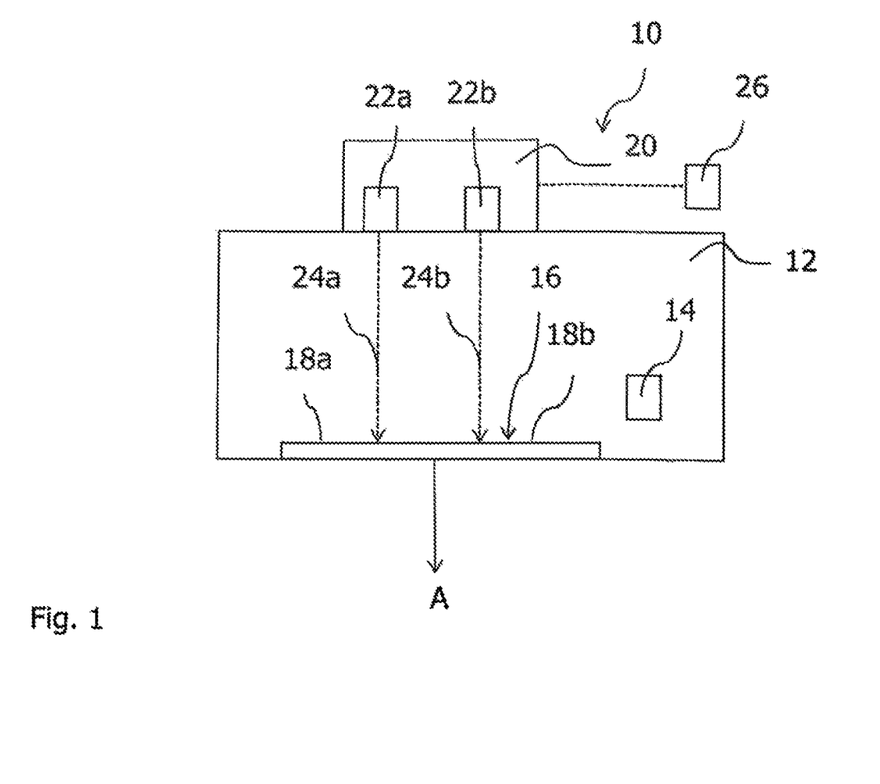
FIG. 1 shows a schematic representation of an apparatus for producing three-dimensional work pieces.

FIG. 1 shows an apparatus 10 for producing three-dimensional work pieces by selective laser melting (SLM®). The apparatus 10 comprises a process chamber 12. The process chamber 12 is sealable against the ambient atmosphere, i.e. against the environment surrounding the process chamber 12. A powder application device 14, which is disposed in the process chamber 12, serves to apply a raw material powder onto a carrier 16. As indicated by an arrow A in FIG. 1, the carrier 16 is designed to be displaceable in a vertical direction so that, with increasing construction height of a work piece, as it is built up in layers from the raw material powder on the carrier 16, the carrier 16 can be moved downwards in the vertical direction. As becomes apparent from FIG. 2, a first and a second irradiation area 18a, 18b is defined on a surface of the carrier 16.

Figure 2:
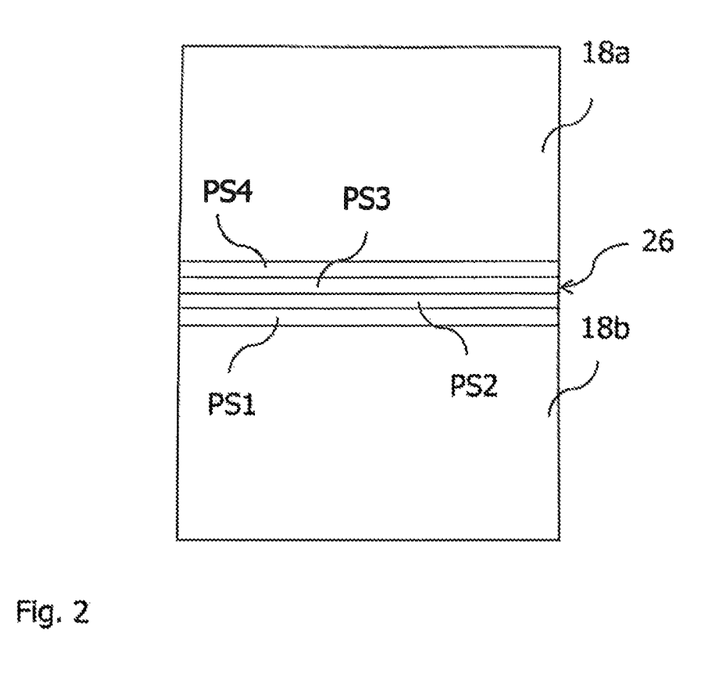
FIG. 2 shows a top view of a carrier of the apparatus depicted in FIG. 1.

The apparatus 10 further comprises an irradiation system 20 for selectively irradiating laser radiation onto the raw material powder applied onto the carrier 16. By means of the irradiation system 20, the raw material powder applied onto the carrier 16 may be subjected to laser radiation in a site-selective manner in dependence on the desired geometry of the work piece that is to be produced. The irradiation system 20 comprises a first and a second irradiation unit 22a, 22b. The first irradiation unit 22a is associated with the first irradiation area 18a defined on the surface of the carrier 16 and is configured to selectively irradiate an electromagnetic or particle radiation beam 24a onto the raw material powder applied onto the first irradiation area 18a. The second irradiation unit 22b is associated with the second irradiation area 18b defined on the surface of the carrier 16 and is configured to selectively irradiate an electromagnetic or particle radiation beam 24b onto the raw material powder applied onto the second irradiation area 18b.

Each irradiation unit 22a, 22b may comprise a laser beam source. It is, however, also conceivable that the irradiation units 22a, 22b are associated with a single laser beam source, wherein a radiation beam provided by the single radiation beam source, by suitable means such as, for example, beam splitters and/or mirrors, may be split and/or deflected as required so as to direct the radiation beam provided by the radiation beam source to the irradiation units 22a, 22b. A laser beam source associated with only one irradiation unit 22a, 22b or with both irradiation units 22a, 22b may, for example, comprise a diode pumped Ytterbium fibre laser emitting laser light at a wavelength of approximately 1070 to 1080 nm.

Further, each irradiation unit 22a, 22b may comprise an optical unit for guiding and/or processing a radiation beam emitted by the radiation beam source and supplied to the irradiation unit 22a, 22b. The optical unit may comprise a beam expander for expanding the radiation beam, a scanner and an object lens. Alternatively, the optical unit may comprise a beam expander including a focusing optic and a scanner unit. By means of the scanner unit, the position of the focus of the radiation beam both in the direction of the beam path and in a plane perpendicular to the beam path can be changed and adapted. The scanner unit may be designed in the form of a galvanometer scanner and the object lens may be an f-theta object lens. The operation of the irradiation system 20 is controlled by means of a control device 27.

By means of the control device 27, each irradiation unit 22a, 22b is controlled such that the radiation beam 24a, 24b emitted by the irradiation unit 22a, 22b is irradiated onto the raw material powder applied onto the irradiation area 18a, 18b associated with the irradiation unit 22a, 22b in a site selective manner and independent of the irradiation of the other irradiation area 18a, 18b not associated with the irradiation unit 22a, 22b in question. In other words, each irradiation area 18a, 18b defined on the carrier 16 is individually and independently irradiated using a desired irradiation pattern. This, a large three-dimensional work piece may be built-up on the carrier 16 in an additive layer construction process within a relatively short time and at reasonable costs by simultaneously irradiating the first and the second irradiation area 18a, 18b defined on the carrier 16 with electromagnetic or particle radiation emitted by the irradiation units 22a, 22b.

Beside the irradiation areas 18a, 18b an overlap area 26 is defined on the surface of the carrier 16, see FIG. 2. Raw material powder applied onto the overlap area 26 is selectively irradiatable with electromagnetic or particle radiation by both irradiation units 22a, 22b of the irradiation system 20. In overlap area 26 has the form of a stripe which is arranged between the first and the second irradiation area 18a, 18b.

The overlap area 26 is divided into a plurality of partitioning regions PS1, PS2, PS3, PS4. In particular, the overlap area 26 is divided into four partitioning regions PS1, PS2, PS3, PS4 in the form of partitioning stripes extending substantially parallel to each other.

The radiation beams 24a, 24b emitted by the irradiation units 22a, 22b of the irradiation system 20 are guided over the layer of raw material powder received on the carrier 16 according to a predefined radiation pattern. The radiation pattern may be any suitable radiation pattern, for example a stripe pattern, see FIG. 4, a chessboard pattern, see FIG. 5, or a pattern comprising arbitrarily shaped sections, wherein the individual sections S or the radiation pattern may be defined by a plurality of substantially parallel scan vectors V. The radiation pattern according to which the radiation beams 24a, 24b emitted by the irradiation units 22a, 22b of the irradiation system 20 are guided over subsequent layers or raw material powder are rotated relative to each ether. A contour C of the three-dimensional work piece to be produced, which may be a substantially line-shaped inner or outer contour of the three-dimensional work piece, may be defined by a plurality of individual scan points P, see FIGS. 6 and 7.

Figure 3:
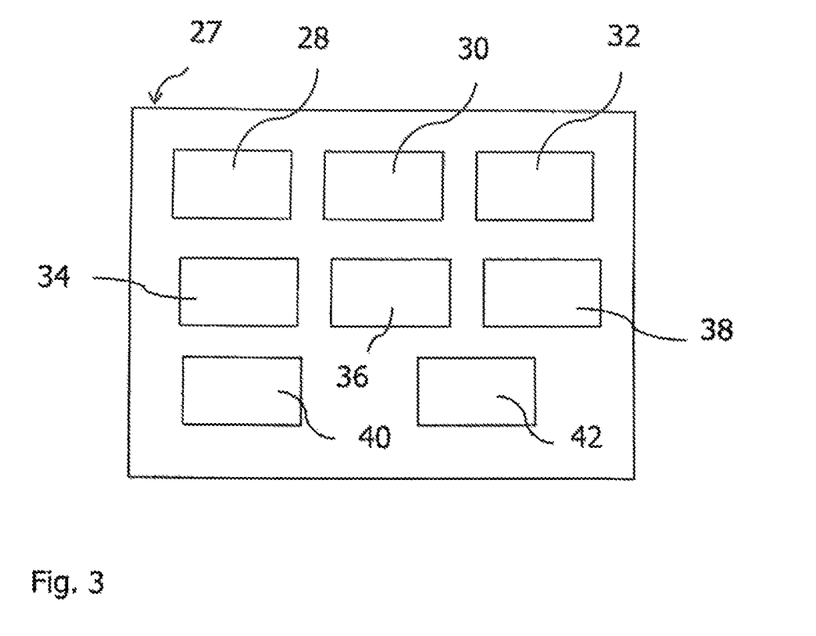
FIG. 3 shows a more detailed view of a device for controlling an irradiation system of the apparatus depicted in FIG. 1.

As already indicated above, the operation of the irradiation system 20 is controlled by means of the control device 27 which, in a schematic representation, is depicted in greater detail in FIG. 3. The various units of the control device 27 shown in FIG. 3 and described in the following may be implemented in hardware or software as desired. The control device 27 comprises a definition unit 28 adapted to define the first and the second irradiation area 18a, 18b as well as the overlap area 26 on the surface of the carrier 16. A first assigning unit 30 serves to assign the first irradiation unit 22a of the irradiation system 20 to the first irradiation area 18a and the overlap area 26, and to assign the second irradiation unit 22b of the irradiation system 20 to the second irradiation area 18b and the overlap area 26. The control device 27 further comprises a determining unit 32 which is adapted to perform an analysis of the arrangement of the radiation pattern according to which the radiation beams 24a, 24b emitted by the irradiation units 22a, 22b are guided over the layer of raw material powder received on the carrier 16 and/or a contour of the three-dimensional work piece to be produced relative to the irradiation areas 18a, 18b and the overlap area 26 defined on the surface of the carrier 16.

Figure 4:
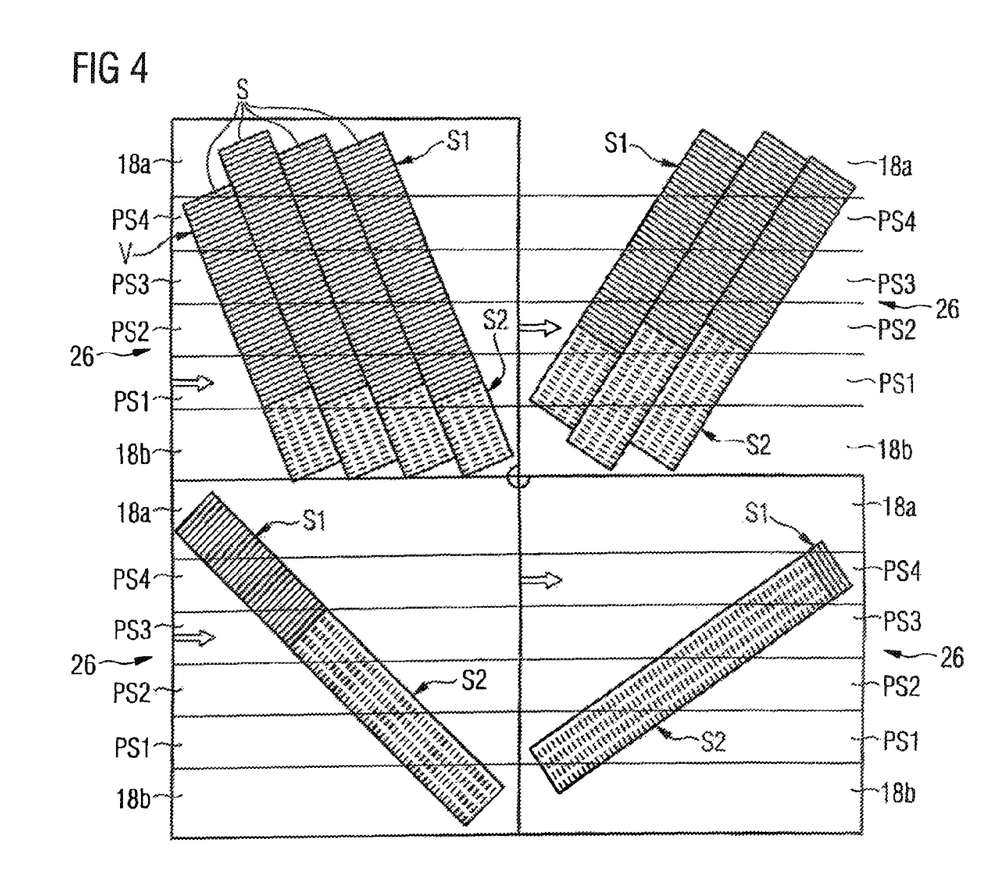
FIG. 4 shows the splitting of a section of a radiation pattern, which extends into a first and a second irradiation area defined on a surface of a carrier of the apparatus depicted in FIG. 1, into a first portion which is assigned to a first irradiation unit of the apparatus depicted in FIG. 1 and second portion which is assigned to a second irradiation unit of the apparatus depicted in FIG. 1.
Figure 6:
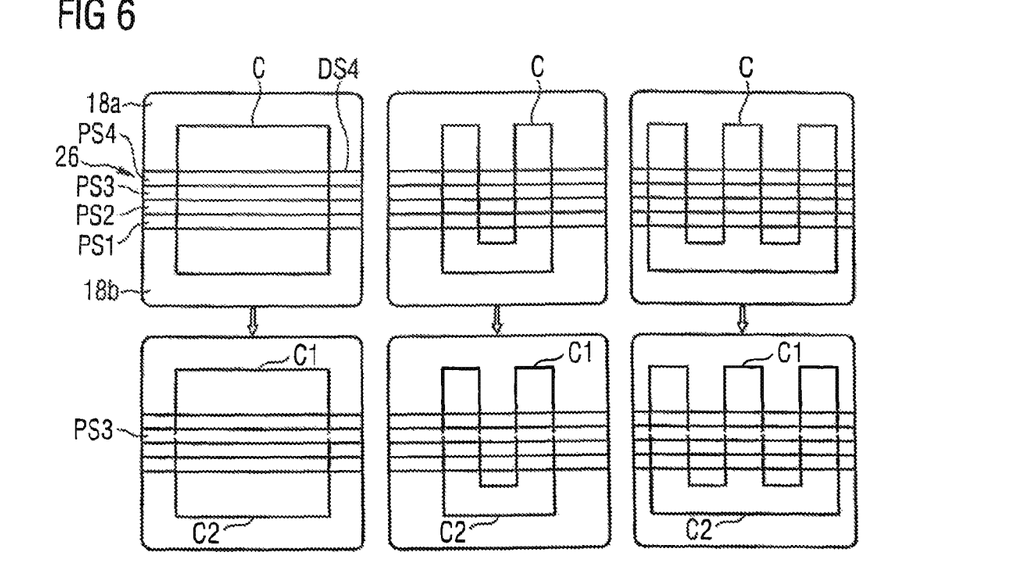
FIG. 6 shows the splitting of different contours, which extend into the first and the second irradiation area defined on the surface of the carrier of the apparatus depicted in FIG. 1, into a first portion which is assigned to a first irradiation unit of the apparatus depicted in FIG. 1 and second portion which is assigned to a second irradiation unit of the apparatus depicted in FIG. 1.

If the determining unit 32 determines that a section S of a radiation pattern and/or a contour C extend(s) into the first and the second irradiation area 18a, 18b defined on the surface of the carrier 16, i.e. if the determining unit 32 determines that a section S of a radiation pattern and/or a contour extend(s) into more than one irradiation area 18a, 18b exclusively associated with only one irradiation unit 22a, 22b, said section S of the radiation pattern and/or said contour C, under the control of a splitting unit 34 of the control device 27, is split into a first portion S1, C1 and a second portion S2, C2, as depicted in FIGS. 4 and 6. In particular, said section S of the radiation pattern and/or said contour C is split in a splitting region of the section S of the radiation pattern and/or the contour C which is located in the overlap area 26.

As becomes apparent from FIG. 4, the sections S of the radiation pattern which extend into the first and the second irradiation area 18a, 18b, in subsequent irradiation steps, i.e. upon irradiating subsequent layers of raw material powder, aside from being rotated relative to each other, are split into a first portion S1 and a second portion S2 in different ones of the plurality of partitioning regions PS1, PS3, PS2, PS4 of the overlap area 26 which are defined by means of a dividing unit 36 of the control device 27. Specifically, in a first irradiation step for irradiating a first layer of raw material powder received on the carrier 16, the sections S of the radiation pattern are split in a splitting region located in a first partitioning region PS1 of the overlap area 26, see upper left section of FIG. 4. In a second irradiation step for irradiating a second layer of raw material powder received on the carrier 16, the sections S or the radiation pattern are split in a splitting region located in a third partitioning region PS3 of the overlap area 26, see lower left section of FIG. 4. In a third irradiation step for irradiating a third layer of raw material powder received on the carrier 16, the sections s of the radiation pattern are split in a splitting region located in a second partitioning region PS2 of the overlap area 26, see upper right section of FIG. 4. Finally, in a fourth irradiation step for irradiating a fourth layer of raw material powder received on the carrier 16, the sections S of the radiation pattern are split in a splitting region located in a fourth partitioning region PS4 of the overlap area 26, see lower right section of FIG. 4. Likewise, also the splitting of a contour C, in subsequent irradiation steps may be effected in different ones of the plurality of partitioning regions PS1, PS3, PS2, PS4 of the overlap area 26.

As becomes apparent from FIG. 4, the sections S of a radiation pattern which extend into the first and the second irradiation area 18a, 18b are split into a first and a second portion S1, S2 between adjacent scan vectors V. Thus, upon splitting a section S of a radiation pattern defined by a plurality of scan vectors V, splitting of individual scan vectors V is avoided.

Figure 7:
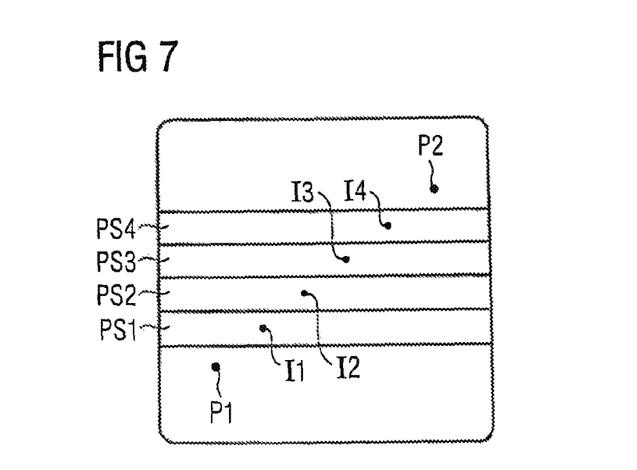
FIG. 7 shows the identification of an intersection point at which a contour is split into a first and a second portion.

As depicted in FIGS. 6 and 7, a contour C which extends into the first and the second irradiation area 18a, 18b defined on the surface of the carrier 16 is split into a first and a second portion C1, C2 at an intersection point I1, I2, I3, I4 which is located in a selected partitioning region PS1, PS2, PS3, PS4 of the overlap area 26, wherein the splitting of the contour C should be effected and which is arranged between a first scan point P1 of the contour C located in the first irradiation area 18a and a second scan point P2 of the contour C located in the second irradiation area 18b. In particular, the contour C according to FIG. 7, in a first irradiation step for irradiating a first layer of raw material powder received on the carrier 16, is split at the intersection point I1 located in partitioning region PS1, in a second irradiation step for irradiating a second layer of raw material powder received on the carrier 16, is split at the intersection point I3 located in partitioning region PS3, in a third irradiation step for irradiating a third layer of raw material powder received on the carrier 16, is split at the intersection point I2 located in partitioning region PS2 and in a fourth irradiation step for irradiating a fourth layer of raw material powder received on the carrier 16, is split at the intersection point I4 located in partitioning region PS4.

Each one of the intersection points I1, I2, I3, I4 may be a scan point of the contour C which is already present. In case a plurality of scan points of the contour C are located in a selected partitioning region PS1, PS2, PS3, PS4, wherein the splitting of the contour C should be effected, a scan point closest to a center line of the selected partitioning region PS1, PS2, PS3, PS4 may be selected as the intersection point I1, I2, I3, I4. In case, however, the contour C does not contain a scan point located in the selected partitioning region PS1, PS2, PS3, PS4, wherein the splitting of the contour C should be effected, an intersection point I1, I2, I3, I4 may be defined, for example as a point located on a center line of the selected partitioning region PS1, PS2, PS3, PS4.

Under the control of the splitting unit 34, sections S of a radiation pattern and/or contours C which extend into the first and the second irradiation area 18a, 18b are split in such a manner that the first and the second portion S1, C1, S2, C2 of the section S of the radiation pattern and/or the contour C comprises a predetermined minimum number of predefined elements of said section S of the radiation pattern and/or said contour C. Predefined elements of a section S of the radiation pattern may, for example, be the scan vectors V defining the section S of the radiation pattern. Predefined elements of a contour C may, for example, be the scan points defining the contour C.

The first portion S1, C1 of the split section S of the radiation pattern and/or the split contour C, under the control of a second assigning unit 38 of the control device 27, is assigned to the first irradiation unit 22a, whereas the second portion S2, C2 of the split section S of the radiation pattern and/or the split contour C, under the control of the second assigning unit 38 of the control device 27, is assigned to the second irradiation unit 22b. Thus, the first portion S1, C1 of the section S of the radiation pattern and/or the contour C is defined by irradiating electromagnetic or particle radiation onto the raw material powder received on the carrier 16 which is provided by the first irradiation unit 22a assigned to the first irradiation area 18a. Similarly, the second portion S2, C2 of the section S of the radiation pattern and/or the contour C is defined by irradiating electromagnetic or particle radiation onto the raw material powder received on the carrier 16 which is provided by the second irradiation unit 22b assigned to the second irradiation area 18b.

If the analysis of the arrangement of the radiation pattern and/or a contour C relative to the irradiation areas 22a, 22b and the overlap area 26 performed by the determining unit 32 of the control device 27 reveals, that a section S of the radiation pattern and/or a contour C in its entirety is located in the overlap area 26, said section S of the radiation pattern and/or said contour C, by the second assigning unit 38 of the control device 27, is assigned to either the first or the second irradiation unit 22a, 22b. This is shown for the exemplary embodiment of a chessboard radiation pattern in FIG. 5. A contour C which in its entirety is located in the overlap area 26, however, may be treated likewise.

Figure 5:
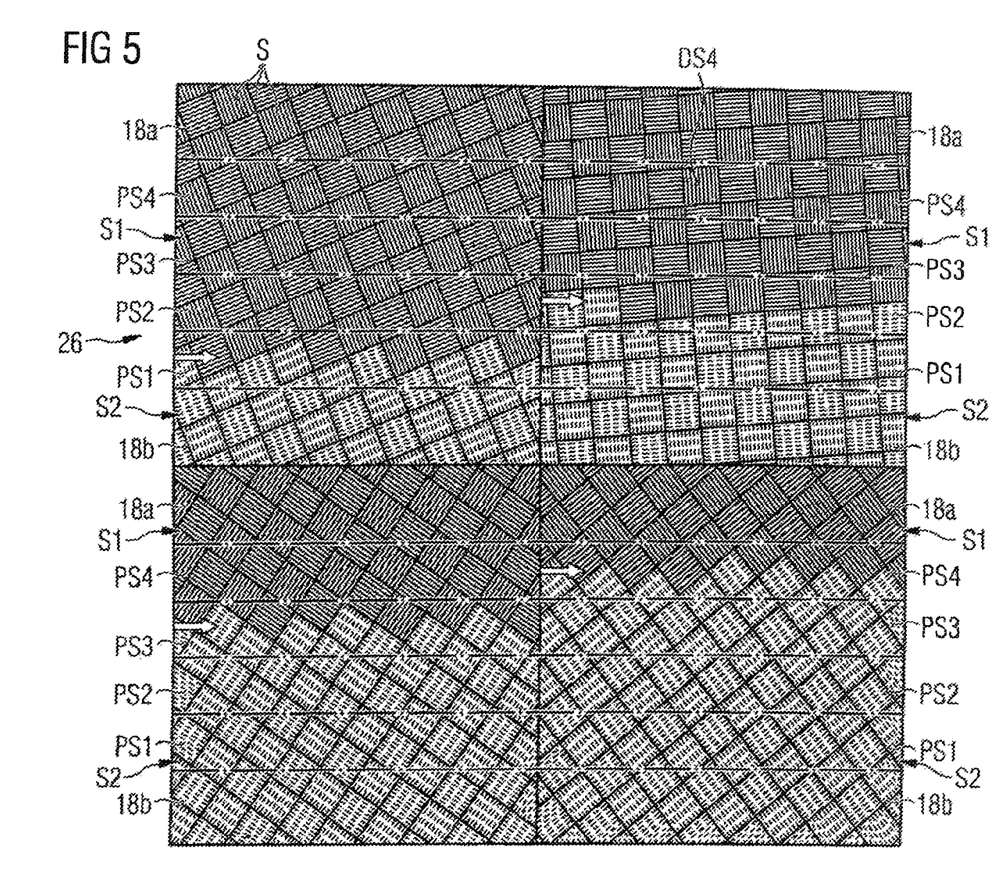
FIG. 5 shows the assigning of sections of a radiation pattern, which in their entirety are located in an overlap area defined on the surface of the carrier of the apparatus depicted in FIG. 1, to either the first or the second irradiation unit of the apparatus depicted in FIG. 1.

In a first irradiation step for irradiating a first layer of raw material powder received on the carrier 16, sections S of the radiation pattern having a center point located in a region of the first partitioning region PS1 which is closer to the first irradiation area 18a, i.e. a region of the first partitioning region PS1 above a center line of the first partitioning region PS1 in FIG. 5, by the second assigning unit 38 of the control device 27, is assigned to the first irradiation unit 22a. To the contrary, sections S of the radiation pattern having a center point located in a region of the first partitioning region PS1 which is closer to the second irradiation area 18b, i.e. a region of the first partitioning region PS1 below a center line of the first partitioning region PS1 in FIG. 5, by the second assigning unit 38 of the control device 27, is assigned to the second irradiation unit 22b, see upper left section of FIG. 5. The same assignment steps are performed in a second irradiation step for irradiating a second layer of raw material powder received on the carrier 16, see lower left section of FIG. 4, a third irradiation step for irradiating a third layer of raw material powder received on the carrier 16, see upper right section of FIG. 4 and a fourth irradiation step for irradiating a fourth layer of raw material powder received on the carrier 16, see lower right section of FIG. 4, wherein the partitioning region PS1, PS3, PS2, PS4 in subsequent irradiation steps is varied as described above in connection with the splitting of radiation pattern sections S and contours C.

Sections S of the radiation pattern and/or contours C which extend into the overlap area 26 and only one of the first and the second irradiation area 18a, 18b are treated similar to sections S of the radiation pattern and/or contours C which in their entirety are located in the overlap area 26, i.e. these sections S of the radiation pattern and/or contours C may be assigned to either the first or the second irradiation unit 22a, 22b. In particular, a section of the radiation pattern S and/or a contour C which extends into the overlap area 26 and the first irradiation area 18a is assigned to the first irradiation unit 22a, whereas a section S of the radiation pattern and/or a contour C, which extends into the second irradiation area 18b and the overlap area 26 is assigned to the second irradiation unit 22b.

If the analysis of the arrangement of the radiation pattern and/or a contour C relative to the irradiation areas 18a, 18b and the overlap area 26 performed by the determining unit 32 of the control device 27 reveals that a section S of the radiation pattern and/or a contour C in its entirety is located in the first irradiation area 18a, said section S of the radiation pattern and/or said contour C, in its entirety, is assigned to the first irradiation unit 22a. Similarly, if it is determined, that a section S of the radiation pattern and/or a contour C, in its entirety, is located in the second irradiation area 18b, said section S of the radiation pattern and/or said contour C, in its entirety, is assigned to the second in irradiation unit 22b.

The control device 27 further comprises an adjusting unit 40. The adjusting unit 40 serves to adjust the section S of the radiation pattern and/or the contour C which extend(s) into the first and the second irradiation area 18a, 18b defined on the surface of the carrier 16 and which is therefore split into a first portion S1, C1, S2, C2 in order to increase or to decrease a distance between the first and the second portion S1, C1, S2, C2 of the section S of the radiation pattern and/or the contour C. For example, a distance between adjacent scan vectors V in the splitting region of the section S of the radiation pattern, under the control of the adjusting unit 40 may be increased in order to avoid an excessive application of radiation energy into the splitting region of the section S of the radiation pattern, or may be decreased in order to ensure a consistent application of radiation energy also into the splitting region of the section S of the radiation pattern. Similarly, a distance between a first and a second scan point P1, P2 of a contour C, which are located adjacent to an intersection point I1, I2, I3, I4 at which the contour C is split, may be increased in order to avoid an excessive application of radiation energy into the splitting region of the contour C, or may be decreased in order to ensure a consistent application of radiation energy also into the splitting region of the contour C.

Moreover, a control unit 42 of the control device 27 serves to control the first and the section irradiation unit 22a, 22b so as to increase or to decrease the power of the radiation beams 24a, 24b emitted by the first and the second irradiation unit 22a, 2b in a part of a section S of the radiation pattern and/or a contour C which extend(s) into the first and the second irradiation area 18a, 18b adjacent to the splitting region of the section S of the radiation pattern and/or the contour C in order to either avoid an excessive application of radiation energy into the splitting region of the section S of the radiation pattern and/or the contour C or to ensure a consistent application of radiation energy into the splitting region of the section S of the radiation pattern and/or the contour C, as desired.

Figure 8:
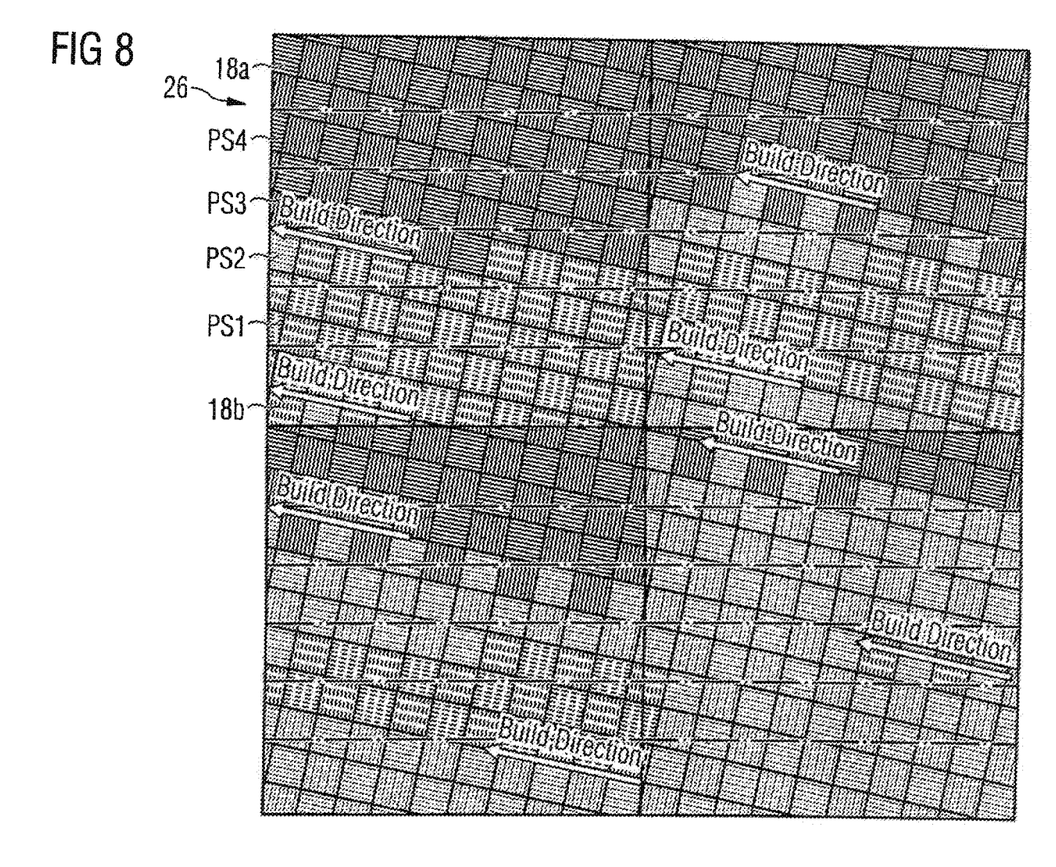
FIG. 8 shows an example of how sections of a radiation pattern which are located in the overlap area defined on the surface of the carder of the apparatus depicted in FIG. 1 and which are assigned to either the first and the second irradiation unit of the apparatus depicted in FIG. 1 are irradiated in a successive order.

Further, the control unit 42 controls the first and the second irradiation unit 22a, 22b of the irradiation system 20 in such a manner that the first and the second portion S1, C1, S2, C2 of the section S of the radiation pattern and/or the contour C which extend(s) into the first and the second irradiation area 18a, 18b and thus split are successively irradiated with a radiation beam 24a, 24b emitted by the first and the second irradiation unit 22a, 2b, respectively. As becomes apparent from FIG. 8, the first and the second irradiation unit 22a, 22b are controlled in such a manner that, at first, only the first irradiation unit 22a irradiates regions of the first portion S1, C1 of the section S of the radiation pattern which are located in the overlap area 26, whereas the second irradiation unit 22b irradiates regions of the second portion S2, C2 of the section S of the radiation pattern which are located outside of the overlap area 26, see upper left, upper right and lower left part of FIG. 8. The second irradiation unit 22b start irradiating regions of the second portion S2, C2 of the section S of the radiation pattern which are located in the overlap area 26 only after irradiation of the regions of the first portion S1, C1 of the section S of the radiation pattern which are located in the overlap area 26 is completed and the first irradiation unit 22a is operated to irradiate regions of the first portion S1, C1 of the section S of the radiation pattern which are located outside of the overlap area 26.

The invention claimed is:

1. Method for controlling, by a control device an irradiation system for use in an apparatus for producing a three-dimensional work piece and comprising a plurality of irradiation units, the method comprising the steps of:
defining a first and a second irradiation area as well as an overlap area arranged between the first and the second irradiation area on a surface of a carrier adapted to receive a layer of raw material powder,
assigning a first irradiation unit of the irradiation system to the first irradiation area and the overlap area,
assigning a second irradiation unit of the irradiation system to the second irradiation area and the overlap area,
determining that a section of a radiation pattern according to which radiation beams emitted by the irradiation units of the irradiation system are guided over the layer of raw material powder received on the carrier and/or a contour of the three-dimensional work piece to be produced extend into the first and the second irradiation area defined on the surface of the carrier,
splitting said section of the radiation pattern and/or said contour, in a splitting region of the section of the radiation pattern and/or the contour which is located in the overlap area arranged between the first and the second irradiation area, into a first portion and a second portion,
assigning the first portion of said section of the radiation pattern and/or said contour to the first irradiation unit,
assigning the second portion of said section of the radiation pattern and/or said contour to the second irradiation unit;
forming the three-dimensional work piece with the irradiation system and wherein the control device performs the steps of the defining, the determining, and the splitting.

2. The method according to claim 1, further comprising the steps of:
- determining that a section of the radiation pattern according to which radiation beams emitted by the irradiation units of the irradiation system are guided over the layer of raw material powder received on the carrier and/or a contour of the three-dimensional work piece to be produced in its entirety is located in the overlap area arranged between the first and the second irradiation area, and
- assigning said section of the radiation pattern and/or said contour to either the first or the second irradiation unit.

3. The method according to claim 2,
- wherein the section of the radiation pattern and/or the contour which in its entirety is located in the overlap area arranged between the first and the second irradiation area is assigned to the first irradiation unit, if a predefined element of the section of the radiation pattern and/or the contour is located in a region of the overlap area closer to the first irradiation area, and/or wherein the section of the radiation pattern and/or the contour which in its entirety is located in the overlap area arranged between the first and the second irradiation area is assigned to the second irradiation unit, if a predefined element of the section of the radiation pattern and/or the contour is located in a region of the overlap area closer to the second irradiation area.

4. The method according to claim 1, further comprising the steps of:
- dividing the overlap area defined on the surface of the carrier into a plurality of partitioning regions, and
- splitting the section of the radiation pattern and/or the contour which extend into the first and the second irradiation area defined on the surface of the carrier into a first portion and a second portion in a selected one of the plurality of partitioning regions, wherein the partitioning region wherein the section of the radiation pattern and/or the contour is split into a first portion and a second portion, in subsequent irradiation steps, is selected randomly or according to a predetermined order.

5. The method according to claim 1, comprising at least one of the further steps:
- adjusting the section of the radiation pattern and/or the contour which extend into the first and the second irradiation area defined on the surface of the carrier in order to increase or to decrease a distance between the first and the second portion of the section of the radiation pattern and/or the contour, and
- controlling at least one of the first and the second irradiation unit so as to increase or to decrease the power of a radiation beam emitted by the first and/or the second irradiation unit in a part of said section of the radiation pattern and/or said contour adjacent to the splitting region of said section of the radiation pattern and/or said contour.

6. The method according to claim 1, wherein at least one of the first and the second portion of the section of the radiation pattern and/or the contour which extend into the first and the second irradiation area defined on the surface of the carrier comprises a predetermined minimum number of predefined elements of said section of the radiation pattern and/or said contour.

7. The method according to claim 1, wherein the first and the second irradiation unit are controlled in such a manner that the first and the second portion of the section of the radiation pattern and/or the contour which extend into the first and the second irradiation area defined on the surface of the carrier are successively irradiated with a radiation beam emitted by the first and the second irradiation unit, respectively.

8. The method according to claim 1, wherein the radiation pattern contains a plurality of scan vectors, and wherein the section of the radiation pattern which extends into the first and the second irradiation area defined on the surface of the carrier is split into a first and a second portion between adjacent scan vectors, and/or
- wherein the contour which extends into the first and the second irradiation area defined on the surface of the carrier is split into a first and a second portion at an intersection point arranged between a first scan point of the contour located in the first irradiation area and a second scan point of the contour located in the second irradiation area.

9. A device for controlling an irradiation system for use in an apparatus for producing a three-dimensional work piece and comprising a plurality of irradiation units, the device comprising:
- a definition unit adapted to define a first and a second irradiation area as well as an overlap area arranged between the first and the second irradiation area on a surface of a carrier adapted to receive a layer of raw material powder,
- a first assigning unit adapted to assign a first irradiation unit of the irradiation system to the first irradiation area and the overlap area, and to assign a second irradiation unit of the irradiation system to the second irradiation area and the overlap area,
- a determining unit adapted to determine that a section of a radiation pattern according to which radiation beams emitted by the irradiation units of the irradiation system are guided over the layer of raw material powder received on the carrier and/or a contour of the three-dimensional work piece to be produced extend into the first and the second irradiation area defined on the surface of the carrier,
- a splitting unit adapted to split said section of the radiation pattern and/or said contour, in a splitting region of the radiation pattern and/or the contour which is located in the overlap area arranged between the first and the second irradiation area, into a first portion and a second portion,
- a second assigning unit adapted to assign the first portion of said section of the radiation pattern and/or said contour to the first irradiation unit and to assign the second portion of said section of the radiation pattern and/or said contour to the second irradiation unit; and
- wherein the first and second irradiation units are operable with the control device to produce the three-dimensional work piece from a powder material.

10. The control device according to claim 9, wherein
- the determining unit is adapted to determine that a section of the radiation pattern according to which radiation beams emitted by the irradiation units of the irradiation system are guided over the layer of raw material powder received on the carrier and/or a contour of the three-dimensional work piece to be produced in its entirety is located in the overlap area arranged between the first and the second irradiation area, and wherein
- the second assigning unit is adapted to assign said section of the radiation pattern and/or said contour to either the first or the second irradiation unit, the second assigning unit in particular further being adapted to assign the section of the radiation pattern and/or the contour which in its entirety is located in the overlap area arranged between the first and the second irradiation area to the first irradiation unit, if a predefined element of the section of the radiation pattern and/or the contour is located in a region of the overlap area closer to the first irradiation area, and/or to assign the section of the radiation pattern and/or the contour which in its entirety is located in the overlap area arranged between the first and the second irradiation area to the second irradiation unit, if a predefined element of the section of the radiation pattern and/or the contour is located in a region of the overlap area closer to the second irradiation area.

11. The control device according to claim 9, further comprising:
a dividing unit adapted to divide the overlap area defined on the surface of the carrier into a plurality of partitioning regions, wherein
the splitting unit is adapted to split the section of the radiation pattern and/or the contour which extend into the first and the second irradiation area defined on the surface of the carrier into a first portion and a second portion in a selected one of the plurality of partitioning regions and to select the partitioning region wherein said section of the radiation pattern and/or the contour is split into a first portion and a second portion, in subsequent irradiation steps, randomly or according to a predetermined order.

12. The control device according to claim 9, further comprising at least one of:
an adjusting unit adapted to adjust the section of the radiation pattern and/or the contour which extend into the first and the second irradiation area defined on the surface of the carrier in order to increase or to decrease a distance between the first and the second portion of said section of the radiation pattern and/or said contour, and
a control unit adapted to control at least one of the first and the second irradiation unit so as to increase or to decrease the power of a radiation beam emitted by the first and/or the second irradiation unit in a part of said section of the radiation pattern and/or said contour adjacent to the splitting region of said section of the radiation pattern and/or said contour.

13. The control device according to claim 9, wherein at least one of the first and the second portion of the section of the radiation pattern and/or the contour which extend into the first and the second irradiation area defined on the surface of the carrier comprises a predetermined minimum number of predefined elements of said section of the radiation pattern and/or said contour.

14. The control device according to claim 9, wherein the control unit is adapted to control the first and the second irradiation unit in such a manner that the first and the second portion of the section of the radiation pattern and/or the contour which extend into the first and the second irradiation area defined on the surface of the carrier are successively irradiated with a radiation beam emitted by the first and the second irradiation unit, respectively.

15. The control device according to claim 9, wherein the radiation pattern contains a plurality of scan vectors, and wherein the splitting unit is adapted to split the section of the radiation pattern which extends into the first and the second irradiation area defined on the surface of the carrier into a first and a second portion between adjacent scan vectors and/or to split the contour which extends into the first and the second irradiation area defined on the surface of the carrier into a first and a second portion at an intersection point arranged between a first scan point of the contour located in the first irradiation area and a second scan point of the contour located in the second irradiation area.

* * * * *